(12) United States Patent
Takehana

(10) Patent No.: US 8,974,063 B2
(45) Date of Patent: Mar. 10, 2015

(54) EXHAUST PORT SHUTTER APPARATUS AND PROJECTOR

(75) Inventor: Naoto Takehana, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 530 days.

(21) Appl. No.: 13/194,055

(22) Filed: Jul. 29, 2011

(65) Prior Publication Data

US 2012/0044463 A1 Feb. 23, 2012

(30) Foreign Application Priority Data

Aug. 17, 2010 (JP) ................................ 2010-182363

(51) Int. Cl.
G03B 21/18 (2006.01)
G03B 21/16 (2006.01)
G03B 21/20 (2006.01)

(52) U.S. Cl.
CPC ............ *G03B 21/16* (2013.01); *G03B 21/2026* (2013.01)
USPC ..................... 353/61; 353/52; 353/57; 353/58

(58) Field of Classification Search
CPC ....................................................... G03B 21/16
USPC ................... 353/57, 58, 61; 348/748
See application file for complete search history.

(56) References Cited

U.S. PATENT DOCUMENTS

| 5,176,568 | A * | 1/1993 | Nagatomo et al. ............ 454/285 |
| 6,641,267 | B2 * | 11/2003 | Ohishi et al. ..................... 353/61 |
| 6,955,434 | B2 * | 10/2005 | Hsu ................................. 353/61 |
| 7,484,852 | B2 * | 2/2009 | Kuraie ............................ 353/57 |
| 7,543,942 | B2 | 6/2009 | Yoo |
| 7,604,533 | B2 * | 10/2009 | Ogura et al. ................... 454/155 |
| 7,656,664 | B2 * | 2/2010 | Ye et al. ......................... 361/695 |
| 7,753,533 | B2 * | 7/2010 | Kaneko ........................... 353/61 |
| 7,837,335 | B2 * | 11/2010 | Wen et al. ....................... 353/61 |
| 8,393,739 | B2 * | 3/2013 | Chien et al. .................... 353/61 |
| 8,475,119 | B2 * | 7/2013 | Li ................................. 415/147 |
| 2004/0212784 | A1 * | 10/2004 | Hsu ................................ 353/61 |

(Continued)

FOREIGN PATENT DOCUMENTS

| CN | 1211717 A | 3/1999 |
| CN | 101782716 A | 7/2010 |

(Continued)

OTHER PUBLICATIONS

NCKU-E02 Multiple-turn Cylindrical Cam Mechanism, May 1, 2006.*
https://web.archive.org/web/20070705092030/http://www.mhhe.com/engcs/mech/norton/norton/ch2.html; http://www.mhhe.com/engcs/mech/norton/norton/ch2.html; http://www.mhhe.com/engcs/mech/norton/norton/ch8/cylindrical_cam/cylindrical_cam.htm; dated Jul. 5, 2007.*

*Primary Examiner* — Sultan Chowdhury
*Assistant Examiner* — Bao-Luan Le
(74) *Attorney, Agent, or Firm* — ALG Intellectual Property, LLC

(57) ABSTRACT

An exhaust port shutter apparatus which is attached to an exhaust port of a projector, includes: a guide section in which a first guide groove is provided; louver boards each having a turning shaft pin, the louver boards in which each turning shaft pin is formed so as to have a length which allows the turning shaft pin to pass through the first guide groove and project to the outside of the guide section; and a cam roller that has a cam groove on a peripheral surface thereof, the cam groove into which each turning shaft pin fits, the cam roller that can reciprocate, by rotation thereof, each turning shaft pin by the cam groove along the first guide groove in a first direction, wherein the louver boards are rotated at a necessary angle as a result of the cam roller being rotated and open and close the exhaust port.

10 Claims, 8 Drawing Sheets

(56) References Cited

U.S. PATENT DOCUMENTS

| | | | |
|---|---|---|---|
| 2006/0244927 A1* | 11/2006 | Chen et al. | 353/55 |
| 2007/0060040 A1 | 3/2007 | Ogura et al. | |
| 2007/0211220 A1* | 9/2007 | Kaneko | 353/52 |
| 2008/0138194 A1* | 6/2008 | Wei et al. | 415/121.2 |
| 2009/0109406 A1* | 4/2009 | Wen et al. | 353/61 |
| 2009/0133331 A1* | 5/2009 | Marocco | 49/91.1 |
| 2010/0003126 A1* | 1/2010 | Wang | 415/146 |
| 2010/0007859 A1* | 1/2010 | Chien et al. | 353/61 |

FOREIGN PATENT DOCUMENTS

| | | |
|---|---|---|
| EP | 0899523 A | 3/1999 |
| JP | 3453775 B | 10/2003 |
| JP | 2003-315910 A | 11/2003 |
| JP | 2008-542813 A | 11/2008 |
| JP | 2009-098481 A | 5/2009 |

\* cited by examiner

EXHAUST PORT SHUTTER APPARATUS AND PROJECTOR

CROSS-REFERENCE

The entire disclosure of Japanese Patent Application No. 2010-182363 filed Aug. 17, 2010 is expressly incorporated by reference herein.

BACKGROUND

1. Technical Field

The present invention relates to exhaust port shutter apparatuses and projectors.

2. Related Art

A projector includes a high-pressure discharge lamp such as a mercury lamp or a xenon lamp as a light source, and is provided with a blower fan for dissipating heat to cool the light source because the light source generates a large amount of heat. In addition, an outlet for exhausting the high-temperature exhaust air to the outside is provided.

In order to prevent ingress of foreign matter such as dust, the outlet is provided with an exhaust port opening and closing apparatus that closes the outlet when the projector is not used.

An exhaust port opening and closing apparatus described in JP-A-2003-315910 (Patent Document 1) adopts a mechanism that opens and closes an exhaust port by a shutter apparatus provided with a plurality of openable and closable louver boards.

The exhaust port opening and closing apparatus described in Patent Document 1 connects the plurality of louver boards to a slide knob via a link mechanism and turns the louver boards by manually sliding the slide knob. However, it is troublesome to slide the slide knob manually at each on/off operation of the projector.

SUMMARY

An advantage of some aspects of the invention is to solve the problem described above and to provide an exhaust port shutter apparatus of a projector, the exhaust port shutter apparatus that can automatically open and close louver boards, and a projector using such an exhaust port shutter apparatus.

An aspect of the invention is directed to an exhaust port shutter apparatus which is attached to an exhaust port of a projector, including: a guide section in which a plurality of sets of guide grooves, each being formed of a first guide groove extending in a first direction and a second guide groove extending in a direction intersecting the first direction, are provided; a plurality of louver boards each having a turning shaft pin and a guide pin provided with a predetermined space left between the turning shaft pin and the guide pin, the plurality of louver boards being provided in such a way that each turning shaft pin is guided by the first guide groove of the corresponding set and each guide pin is guided by the second guide groove of the corresponding set, the plurality of louver boards in which each turning shaft pin is formed so as to have a length which allows the turning shaft pin to pass through the first guide groove and project to the outside of the guide section; a cam roller that is placed so as to be rotatable about an axis line and has a cam groove on a peripheral surface thereof, the cam groove into which each turning shaft pin fits, the cam roller that can reciprocate, by rotation thereof, each turning shaft pin by the cam groove along the first guide groove in the first direction; and a drive section that drives and rotates the cam roller, the louver boards are rotated at a necessary angle as a result of the cam roller being rotated by the drive section and open and close the exhaust port.

According to the above aspect of the invention, the louver boards are automatically opened and closed all at once, which ensures ease of operation. Moreover, the drive section such as a motor can open and close the louver boards by being rotated at a necessary rotation angle in the same direction. This eliminates the need for a change over switch for inverting the direction of the current of the drive motor, for example, and makes it possible to simplify the circuit configuration.

The cam groove may be formed so as to form a closed loop on the peripheral surface of the cam roller.

Moreover, the cam groove may be formed so as to have the shape of continuous wave in a circumferential direction on the peripheral surface of the cam roller.

It is possible to improve the airtightness by setting the width of the louver board such that, when the louver boards are closed, an edge of one of the adjacent louver boards is placed to overlap with an edge of the other of the adjacent louver boards.

Furthermore, a sensor detecting a rotation angle position of the cam roller may be provided to control the driving of the drive section based on a signal from the sensor.

Another aspect of the invention is directed to a projector including any one of the exhaust port shutter apparatus described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail based on the accompanying drawings.

Figure 1:
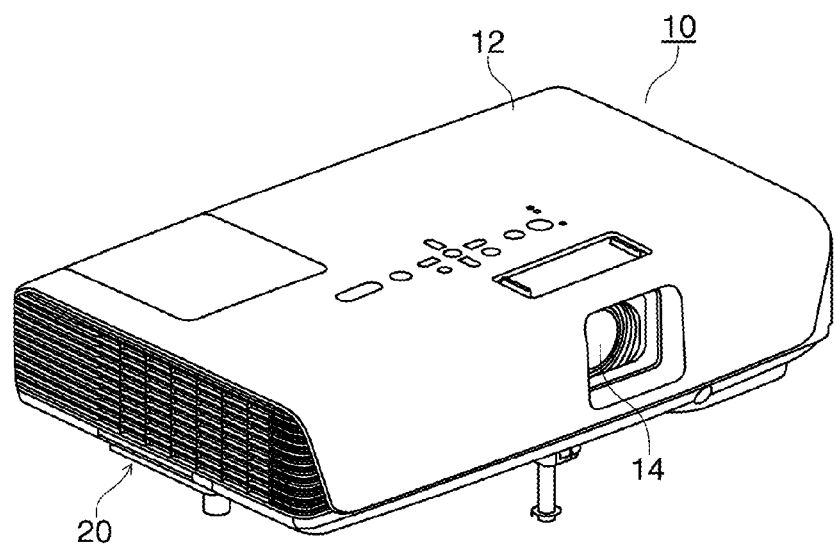
FIG. 1 is a diagram explaining the appearance of a projector.

FIG. 1 is a diagram explaining the appearance of a projector 10.

Though not shown in the drawing, the projector 10 has an image generating unit such as a light source, an optical system, and an LCD, a power supply device, a various kinds of blower fans, and the like, which are provided inside a casing 12. Reference numeral 14 denotes a projection lens. An area where an exhaust port is provided is not limited to a particular area; however, in this embodiment, the exhaust port is provided in a side face of the casing 12. Moreover, a shutter apparatus 20 is provided in the exhaust port. The structure of the shutter apparatus 20 will be described later.

Figure 2:
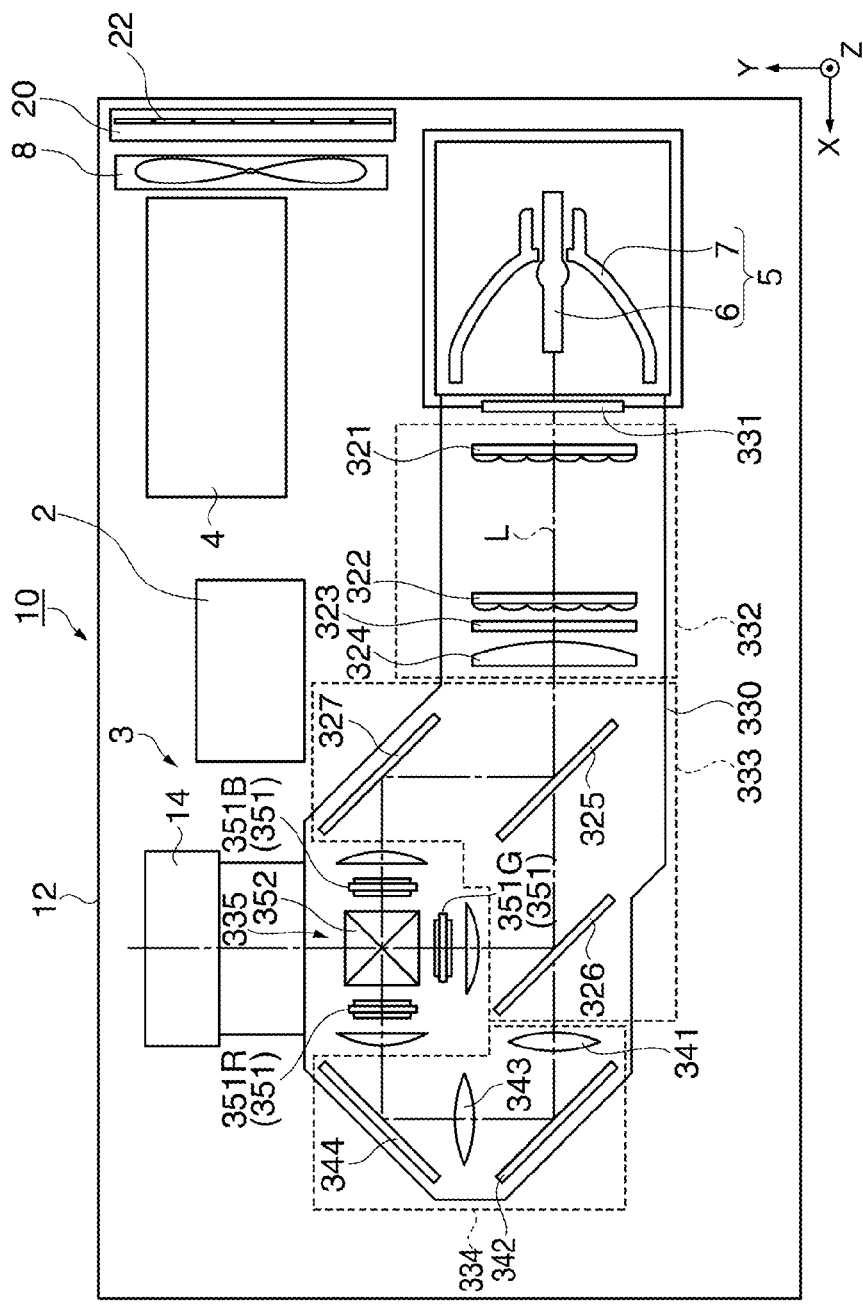
FIG. 2 is a schematic diagram showing an internal configuration of the projector of an embodiment.

FIG. 2 is a schematic diagram showing an internal configuration of the projector 10 of this embodiment.

As shown in FIG. 2, the projector 10 includes the casing 12 forming an outer package, a control section 2, an optical unit 3 having a light source device 5, a power supply device 4 supplying power to the light source device 5 and the control section 2, and the like. Inside the casing 12, a cooling fan 8 that cools the power supply device 4, the light source device 5, etc. is disposed.

The control section 2 includes a CPU (central processing unit), ROM (read only memory), RAM (random access memory), and the like, and functions as a computer. The control section 2 performs control of operation of the projector 10, for example, control related to projection of an image.

Under control of the control section 2, the optical unit 3 optically processes a luminous flux emitted from the light source device 5 and projects the luminous flux thus processed.

As shown in FIG. 2, in addition to the light source device 5, the optical unit 3 includes a parallelizing lens 331, an optical integration illumination system 332, a color separation system 333, a relay system 334, an electrooptic device 335, a projection lens 14, and an optical component housing 330 that disposes these optical components in predetermined positions on an optical path.

The light source device 5 includes a discharge arc tube 6 formed of an ultra-high pressure mercury lamp, a metal halide lamp, or the like and a reflector 7, and is housed in a light source housing. The light source device 5 reflects a luminous flux emitted from the arc tube 6 by the reflector 7 and makes the luminous flux exit to the parallelizing lens 331.

The parallelizing lens 331 is placed on the light source housing and makes the luminous flux emitted from the light source device 5 exit to the optical integration illumination system 332 in such a way that the luminous flux exits in the same direction.

The optical integration illumination system 332 includes a first lens array 321, a second lens array 322, a polarization conversion element 323, and a superimposing lens 324.

The first lens array 321 is an optical element that divides the luminous flux emitted from the light source device 5 into a plurality of partial luminous fluxes, and includes a plurality of small lenses disposed in a matrix in a plane which is nearly perpendicular to an optical axis L of the luminous flux emitted from the light source device 5.

The second lens array 322 has almost the same structure as the first lens array 321, and, together with the superimposing lens 324, superimposes the partial luminous fluxes exiting from the first lens array 321 on the surfaces of liquid crystal light valves 351, which will be described later.

The polarization conversion element 323 has the function of converting each of the randomly polarized lights exiting from the second lens array 322 into virtually one type of polarized light which can be used by the liquid crystal light valves 351.

The color separation system 333 includes two dichroic mirrors 325 and 326 and a reflection mirror 327, and has the function of separating the luminous flux exiting from the optical integration illumination system 332 into three colored lights: a red light (hereinafter referred to as an "R light"), a green light (hereinafter referred to as a "G light"), and a blue light (hereinafter referred to as a "B light").

The relay system 334 includes a light incident-side lens 341, a relay lens 343, and reflection mirrors 342 and 344, and has the function of guiding the R light obtained by separation performed by the color separation system 333 to a liquid crystal light valve 351R for R light. Incidentally, the optical unit 3 is so configured that the relay system 334 guides the R light; however, the configuration is not limited to this configuration. For example, the optical unit 3 may be so configured that the relay system 334 guides the B light.

The electrooptic device 335 includes the liquid crystal light valves 351 as light modulating devices and a cross dichroic prism 352 as a color synthesis optical device, and modulates, according to image information, each colored light obtained by separation performed by the color separation system 333.

The liquid crystal light valves 351 are provided one for each of the three colored lights (the liquid crystal light valve for R light will be referred to as the liquid crystal light valve 351R, the liquid crystal light valve for G light will be referred to as the liquid crystal light valve 351G, and the liquid crystal light valve for B light will be referred to as the liquid crystal light valve 351B) and each have a transmissive liquid crystal panel and a light incident-side polarizer and a light exiting-side polarizer which are disposed on the two sides of the transmissive liquid crystal panel.

The liquid crystal light valves 351 each have an unillustrated rectangular pixel region in which minute pixels are formed in a matrix, and the pixels are each set at a light transmission rate according to a display image signal and form a display image in the pixel region. The colored lights obtained by separation performed by the color separation system 333 are modulated by the liquid crystal light valves 351 and are made to exit to the cross dichroic prism 352.

The cross dichroic prism 352 is formed of four right-angle prisms bonded together and has a virtually square shape in a plan view, and, at the interface at which the right-angle prisms are bonded together, two dielectric multilayers are formed. In the cross dichroic prism 352, the dielectric multilayers reflect the colored lights modulated by the liquid crystal light valves 351R and 351B and transmits the colored light modulated by the liquid crystal light valve 351G, thereby combining the colored lights.

The projection lens 14 is formed as a compound lens into which a plurality of lenses are combined. The projection lens 14 enlarges the light obtained as a result of the lights having been modulated by the liquid crystal light valves 351 and combined by the cross dichroic prism 352, and projects the light onto a screen.

Figure 3:
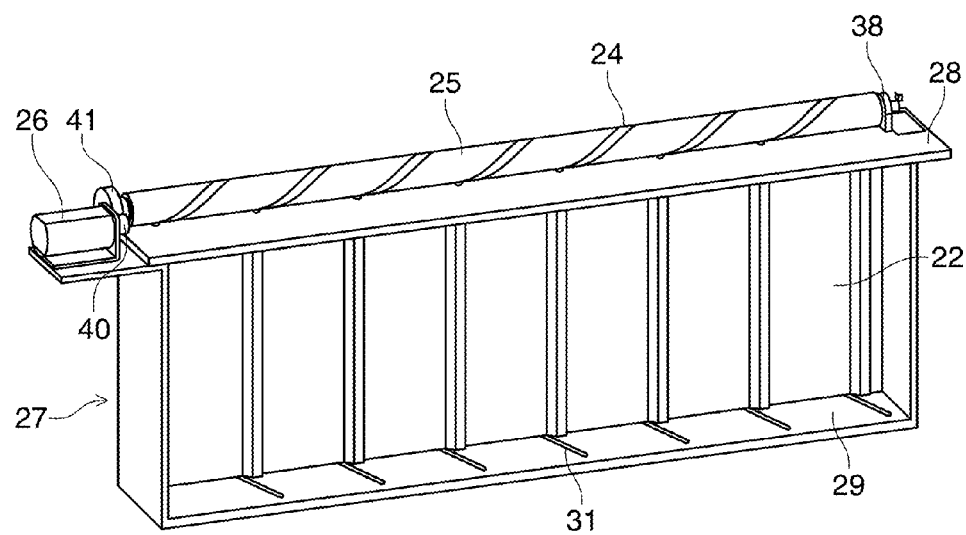
FIG. 3 is an explanatory diagram showing a state in which louver boards are closed.
Figure 4:
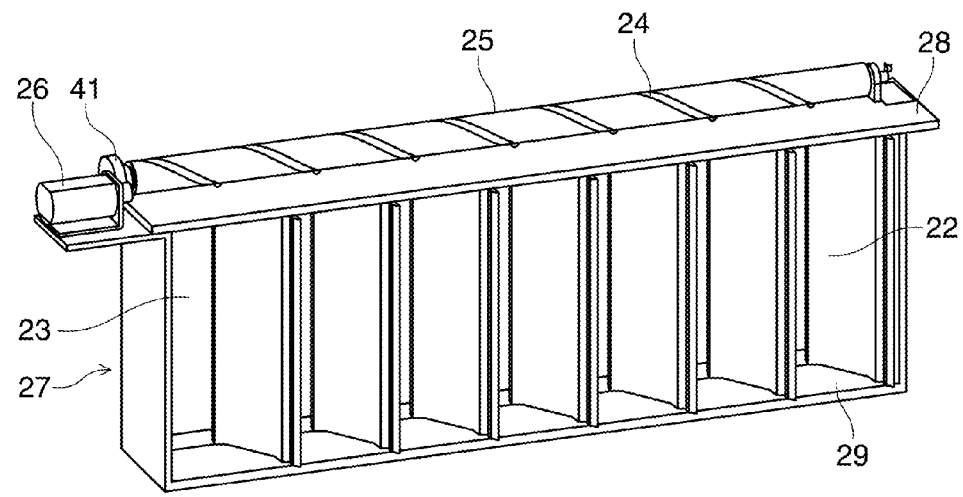
FIG. 4 is an explanatory diagram showing a state in which the louver boards are opened.

Hereinafter, the shutter apparatus 20 will be described. FIG. 3 is an explanatory diagram showing a state in which a plurality of louver boards 22 are closed, and FIG. 4 is an explanatory diagram showing a state in which the louver boards 22 are opened. As shown in FIGS. 3 and 4, in the shutter apparatus 20, the plurality of louver boards 22 are provided in an exhaust port 23 in an openable and closable manner, and the louver boards 22 are provided in such a way that they can be opened and closed all at once by a cam roller 25 provided with cam grooves 24 by a mechanism which will be described later. The cam roller 25 is driven and rotated by a drive motor 26 which is a drive section. When the cam roller 25 is rotated at a necessary rotation angle, the louver boards 22 are opened, and, when the cam roller 25 is further rotated at a necessary rotation angle in the same direction, the louver boards 22 are closed.

With this structure, the louver boards 22 are automatically opened and closed all at once, which ensures ease of operation. Moreover, the cam roller 25 can open and close the louver boards 22 by being rotated at a necessary rotation angle in the same direction. This eliminates the need for a change over switch for inverting the direction of the current of the drive motor 26 and makes it possible to simplify the circuit configuration.

Next, the shutter apparatus 20 will be described in more detail by using FIGS. 3 to 11.

Figure 5:
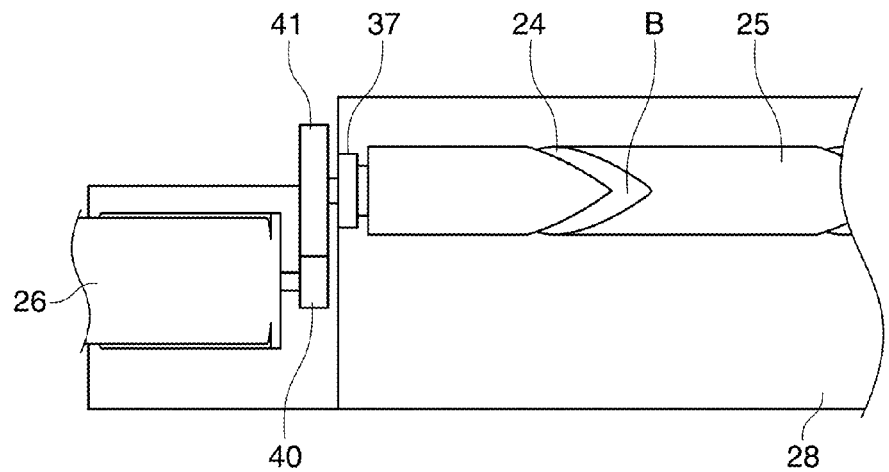
FIG. 5 is a plan view showing a cam groove of a cam roller.

FIG. 5 is a plan view showing the cam groove 24 of the cam roller 25.

Figure 6:
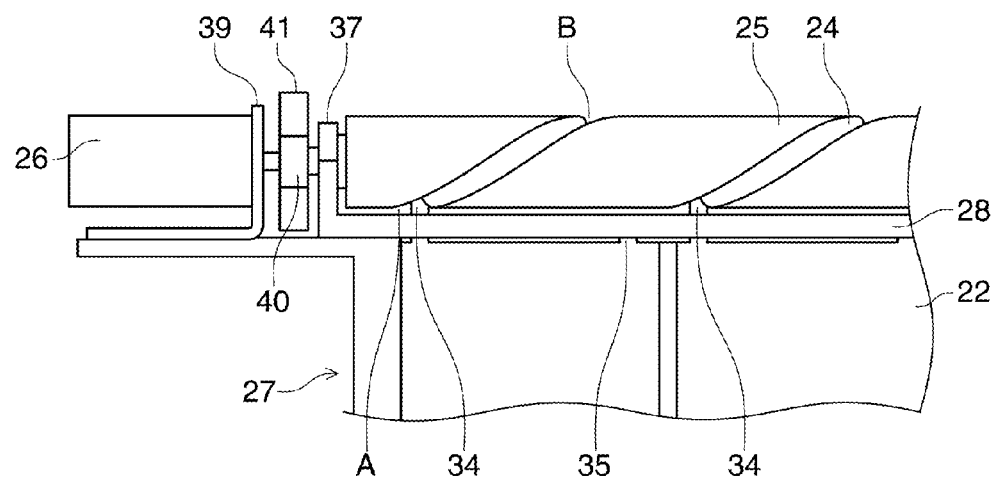
FIG. 6 is an explanatory diagram showing the relationship between the cam grooves and turning shaft pins when the louver boards are closed.
Figure 7:
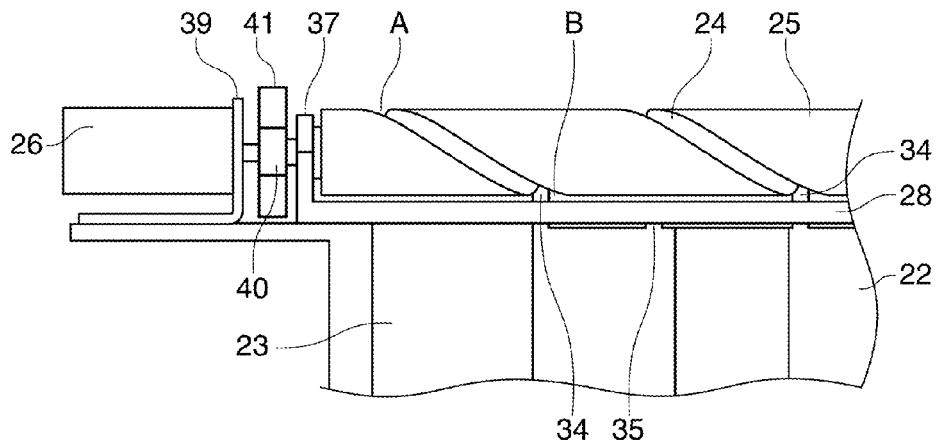
FIG. 7 is an explanatory diagram showing the relationship between the cam grooves and the turning shaft pins when the louver boards are opened.

FIG. 6 is an explanatory diagram showing the relationship between the cam grooves 24 and turning shaft pins when the louver boards 22 are closed, and FIG. 7 is an explanatory diagram showing the relationship between the cam grooves 24 and the turning shaft pins when the louver boards 22 are opened.

Figure 8:
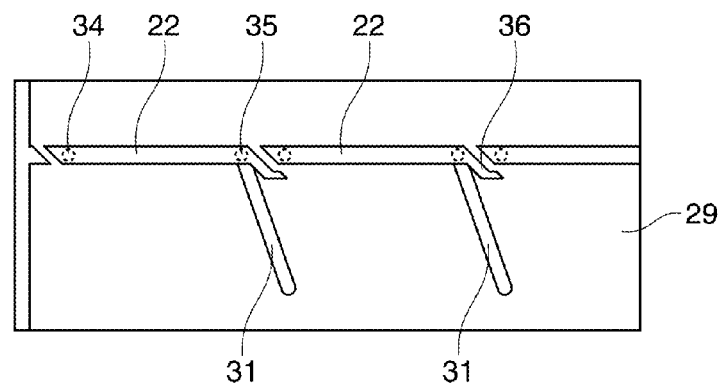
FIG. 8 is an explanatory diagram showing the relationship between the louver boards and guide grooves when the louver boards are closed.
Figure 9:
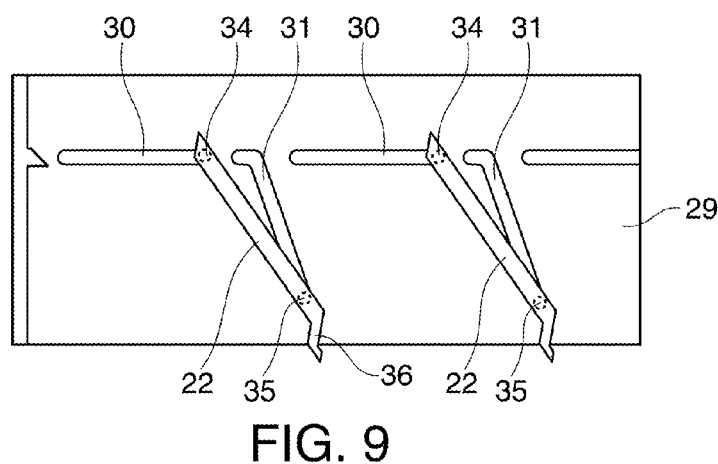
FIG. 9 is an explanatory diagram showing the relationship between the louver boards and the guide grooves when the louver boards are opened.
Figure 10:
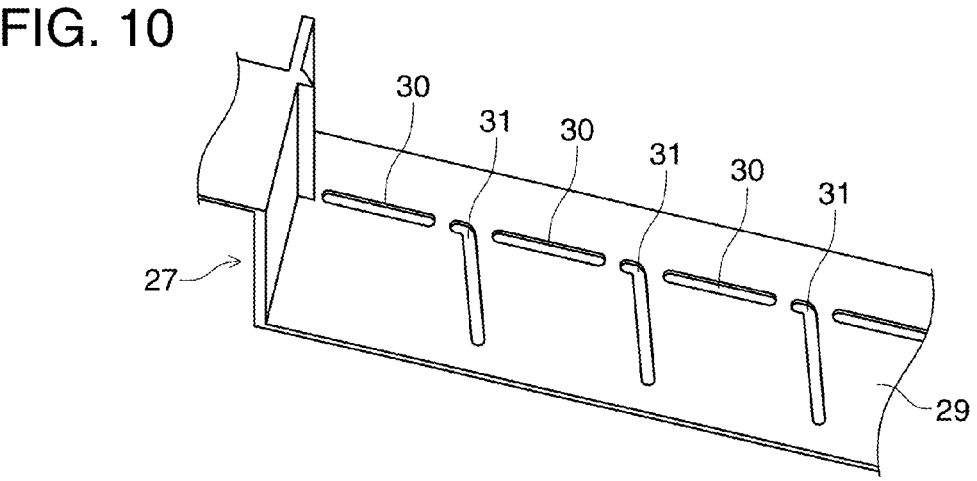
FIG. 10 is an explanatory diagram showing first guide grooves and second guide grooves.

FIG. 8 is an explanatory diagram showing the relationship between the louver boards and guide grooves when the louver boards 22 are closed, and FIG. 9 is an explanatory diagram showing the relationship between the louver boards and the guide grooves when the louver boards 22 are opened. FIG. 10 is an explanatory diagram showing first guide grooves and second guide grooves, and FIG. 11 is an explanatory diagram of the louver board.

Each louver board 22 is rotatably supported between a first guide section 28 corresponding to an upper frame of a frame 27 and a second guide section 29 corresponding to a lower frame of the frame 27.

As shown in FIG. 10, in a face of the first guide section 28 and a face of the second guide section 29, the faces facing each other, a plurality of sets (in this embodiment, seven sets) of guide grooves, each being formed of a first guide groove 30 extending in a first direction which is a longitudinal direction of the guide section and a second guide groove 31 extending in a direction (a direction forming an obtuse angle with the first guide groove 30) intersecting the first direction, are provided.

Figure 11:
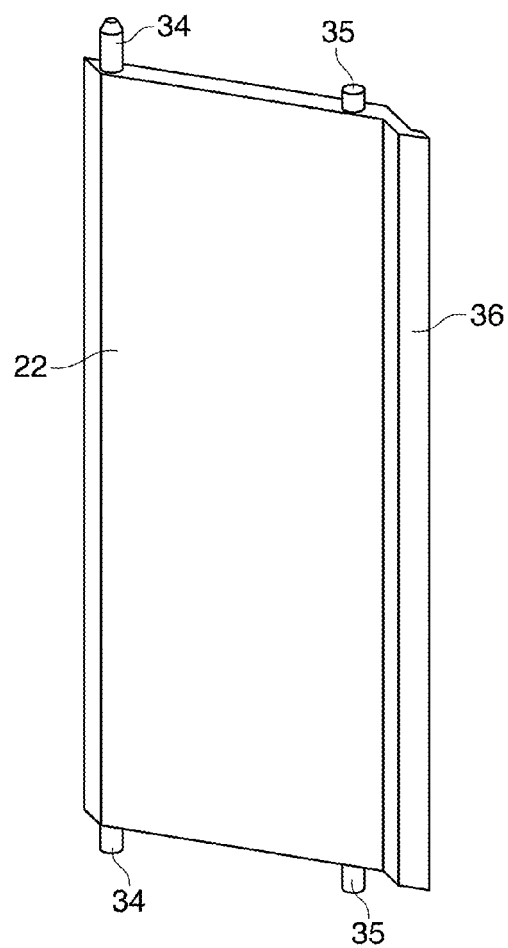
FIG. 11 is an explanatory diagram of the louver board.

As shown in FIG. 11, each louver board 22 has, at the ends thereof, of which one is a first guide section's-side end and the other is a second guide section's-side end, a turning shaft pin 34 and a guide pin 35 which are provided with a predetermined space left between them in a width direction.

In addition, each louver board 22 is so configured that the turning shaft pins 34 fit into the corresponding first guide grooves 30 of the first guide section 28 and the second guide section 29 and are movably guided along the guide grooves and the guide pins 35 fit into the corresponding second guide grooves 31 and are movably guided (FIGS. 8 and 9).

Incidentally, the first guide groove 30 provided in the first guide section 28 is formed as a through-hole.

Moreover, the turning shaft pin 34 of the louver board 22, the turning shaft pin 34 which fits into the first guide groove 30 formed as a through-hole, is formed so as to have a length which allows the turning shaft pin 34 to pass through the first guide groove 30 and project to the outside of the first guide section 28. The tip of the turning shaft pin 34 is formed as a tapered tip having a tapered surface.

Incidentally, when all the louver boards 22 are closed, the louver boards 22 may close the spaces between the adjacent louver boards 22 in a state in which the end faces of the adjacent louver boards 22 make close contact with each other. However, as shown in FIG. 11, it is preferable to improve the airtightness by bending the edge of each louver board 22 along the length thereof and placing a bent portion 36 to overlap with the end of the adjacent louver board 22.

Next, the cam roller 25 is supported on the first guide section 28 along the first guide section 28 in such a way that the cam roller 25 can rotate about an axis line via supporting sections 37 and 38. On a peripheral surface of the cam roller 25, the cam grooves 24 into which the turning shaft pins 34 of the louver boards 22 fit are provided.

The cam roller 25 is rotated about the axis line via a gear 40 and a gear 41 by the drive motor 26 which is fixed and supported on the first guide section 28 by a supporting section 39.

As a result of the rotation of the cam roller 25 about the axis line, the cam grooves 24 can make the turning shaft pins 34 reciprocate along the first guide grooves 30 in the first direction.

Specifically, each cam groove 24 is formed, on the peripheral surface of the cam roller 25, as a cam groove 24 forming a closed loop on the peripheral surface.

That is, the cam groove 24 forms a closed loop in which, when a position in which the turning shaft pin 34 fits into the cam groove 24 is assumed to be a base-point position A in a position shown in FIG. 6 in which all the louver boards 22 are closed, the cam groove 24 extends from the base-point position A in a spiral fashion halfway around the cam roller 25 and reaches a top position B, and extends from the top position B to the opposite side halfway around the cam roller 25 and reaches the base-point position A.

Figure 12:
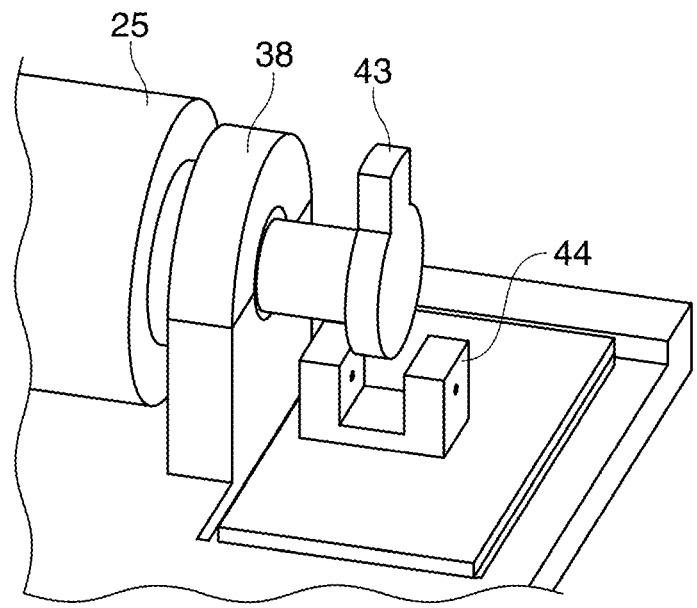
FIG. 12 is an explanatory diagram of a photointerrupter (a sensor).

As shown in FIG. 12, at the end of the cam roller 25, a shielding plate 43 is provided so as to project to the outside. Moreover, on the first guide section 28, a photointerrupter (PI) 44 which is a sensor that is turned on (is made to receive light) and off (is shielded from light) by the shielding plate 43 is provided. Incidentally, as the sensor, other various sensors such as a limit switch can also be used.

This embodiment is structured as described above.

Next, operation for opening and closing the louver boards 22 in the shutter apparatus 20 will be described.

When the louver boards 22 are brought into a state in which all the louver boards 22 are opened from a state in which all the louver boards 22 are closed, the drive motor 26 is driven for a necessary set time by an instruction from the control section 2, whereby the cam roller 25 is rotated at a necessary rotation angle (in this embodiment, 180 degrees). When the cam roller 25 is rotated 180 degrees, each turning shaft pin 34 is pressed against the groove surface of the cam groove 24 from the base-point position A to the top position B, and the turning shaft pin 34 moves along the first guide groove 30 in the first direction (FIGS. 6 to 9). That is, the turning shaft pin 34 moves in the first guide groove 30 from one end to the other end thereof.

On the other hand, when each turning shaft pin 34 moves in the first guide groove 30 in the first direction, each guide pin 35 accordingly moves along the second guide groove 31 from one end to the other end thereof in a second direction (FIGS. 8 and 9). As a result of the turning shaft pins 34 moving in the first direction and the guide pins 35 moving in the second guide groove 31 accordingly, the louver boards 22 are brought into a state in which all the louver boards 22 are opened as shown in FIG. 9 from a state in which all the louver boards 22 are closed as shown in FIG. 8.

When the louver boards 22 are brought into a state in which all the louver boards 22 are closed from a state in which all the louver boards 22 are opened, the drive motor 26 is driven and rotated for a predetermined time by an instruction from the control section 2 in the same direction as the direction in which the drive motor 26 is driven to open all the louver boards 22, whereby the cam roller 25 is rotated another 180 degrees. As a result, each turning shaft pin 34 is pressed against the cam groove 24 halfway around the cam roller 25 on the opposite side from the top position B to the base-point position A and returns in the first guide groove 30 in the first direction, and each guide pin 35 is returned in the second guide groove 31 in the second direction. In this way, all the louver boards 22 are closed.

Figure 13:
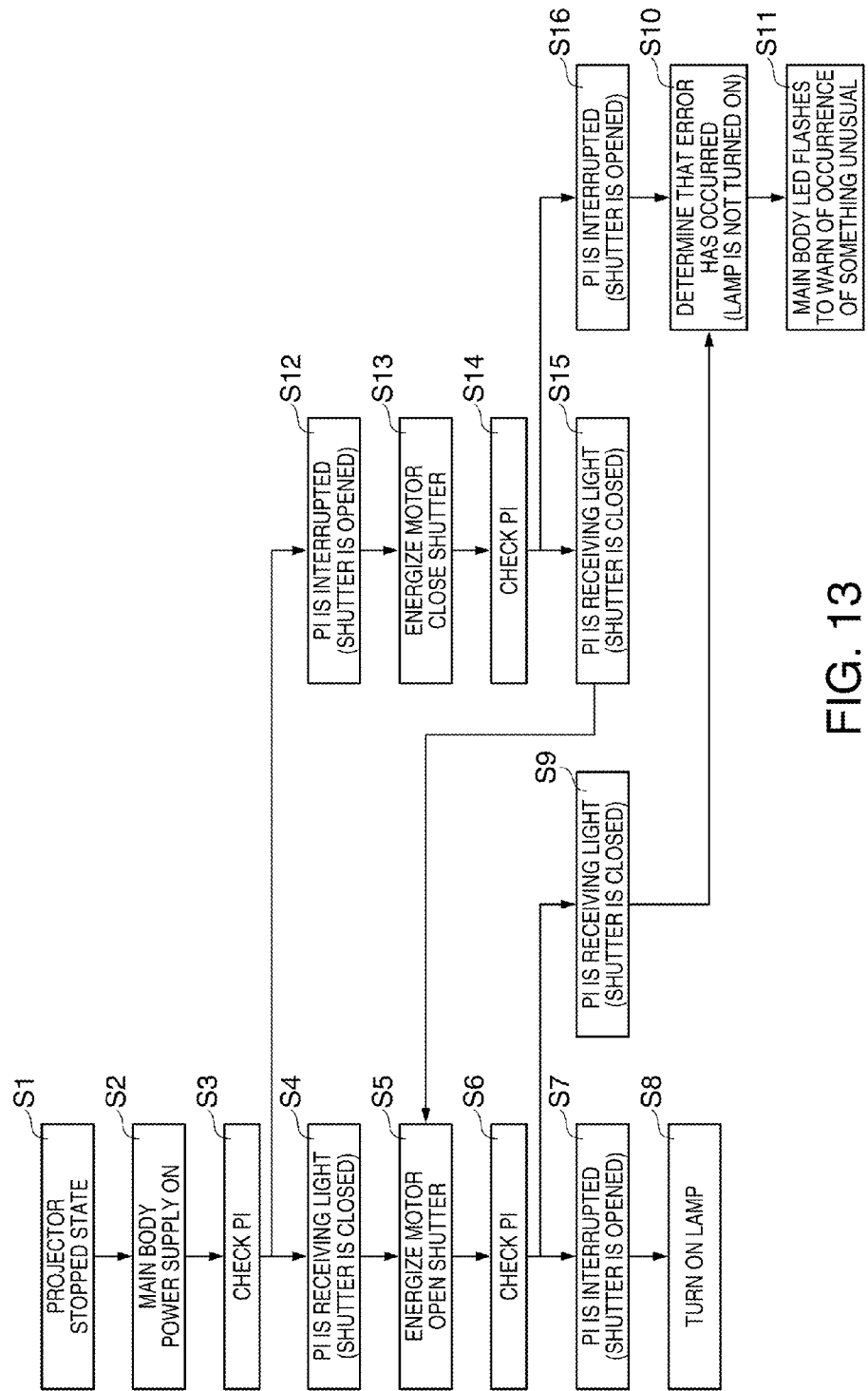
FIG. 13 is a control flow diagram of operation for opening the louver boards.

FIG. 13 is a control flow diagram of operation for opening the shutters (the louver boards 22).

When a main body power-supply switch (not shown) is turned on in a stopped state (S1) of the projector 20 (S2), the control section 2 checks an on/off signal of the photointerrupter 44 (PI) (S3).

If the photointerrupter 44 is in an on (light-receiving) state (S4, FIG. 11), the louver boards 22 are in a state in which all the louver boards 22 are closed (a normal state).

If the louver boards 22 are found to be in a state in which all the louver boards 22 are closed, the drive motor 26 is driven for a necessary set time by an instruction from the control section 2 (S5), whereby the cam roller 25 is rotated at a necessary rotation angle (180 degrees). Then, the control section 2 checks the on/off signal of the photointerrupter 44 (S6). If the photointerrupter 44 is off (is interrupted by the shielding plate 43) (S7), it is determined that the louver boards 22 are in a state in which all the louver boards 22 are opened, the lamp is turned on (S8), and the projector 20 is brought into an operable state. Incidentally, the blower fan 8 for cooling is also driven.

If it is determined in S6 that the photointerrupter 44 is found to be still in an on (light-receiving) state (S9), this means that the louver boards 22 are still in a state in which all the louver boards 22 are closed. Therefore, the control section 2 determines that something unusual occurs, and turns on an unillustrated LED lamp without turning on the lamp (S10), thereby providing a notification that something unusual occurs (S11).

If it is determined in S3 that the photointerrupter 44 is found to be off (be interrupted) (S12), this means that the louver boards 22 are in a state in which all the louver boards 22 are opened and generally means that something unusual occurs. However, the control section 2 drives the drive motor 26 for a predetermined time to make the drive motor 26 perform operation to close the louver boards 22 (S13).

Then, the control section 2 checks the state of the photointerrupter 44 (S14). If the photointerrupter 44 is on (receiving light) (S15), the control section 2 determines that the louver boards 22 are in a state in which all the louver boards 22 are closed and in a normal state, performs steps S5 to S8, and turns on the lamp. Alternatively, the control section 2 performs processing in S5, S6, and S9 to S11 and displays a warning to provide a notification that something unusual occurs.

If the photointerrupter 44 is still off (is interrupted) in S14 (S16), the control section 2 determines that something unusual occurs and warns of the occurrence of something unusual (S11) without turning on the lamp (S10).

When the use of the projector 20 is ended, the lamp is turned off and the blower fan 8 is also stopped when the power-supply switch is turned off. After the blower fan 8 is stopped, all the louver boards 22 are closed in the manner described above.

In this way, a series of operations is ended.

It goes without say that the above-described control method is merely an example and a control method is not limited to the control method described above.

In the embodiment described above, the cam groove 24 of the cam roller 25 is formed into a closed loop. However, it is also possible to open all the louver boards 22 by rotating the cam roller 25 only at a rotation angle of 90 degrees and close all the louver boards 22 by the next 90-degree rotation of the cam roller 25. In this case, the cam groove is formed so as to have the shape of continuous wave in a circumferential direction on the peripheral surface of the cam roller. By opening all the louver boards 22 by rotating the cam roller 90 degrees and closing all the louver boards 22 by rotating the cam roller another 90 degrees, it is possible to open and close all the louver boards 22 two times with one rotation of the cam roller. It is also possible to open and close all the louver boards by rotating the cam roller 45 degrees.

Moreover, by selecting the shape of the cam groove 24, the shapes of the first guide groove 30 and the second guide groove 31, and the directions in which the first guide groove 30 and the second guide groove 31 extend from various options, it is possible to adjust the operation for opening and closing the louver boards 22 in various ways.

Furthermore, in some cases, it is also possible to make the louver boards 22 operate differently by making the shapes etc. of the cam groove 24, the first guide groove 30, and the second guide groove 31 vary among the louver boards 22.

In addition, by using a stepping motor as the drive motor 26, it is also possible to adjust variously the angle at which the louver boards 22 are opened.

What is claimed is:

1. An exhaust port shutter apparatus which is attached to an exhaust port of a projector, comprising:
    a guide section in which a plurality of sets of guide grooves, each being formed of a first guide groove extending in a first direction and a second guide groove extending in a direction intersecting the first direction, are provided;
    a plurality of louver boards each having a turning shaft pin and a guide pin provided with a predetermined space left between the turning shaft pin and the guide pin, the plurality of louver boards being provided in such a way that each turning shaft pin is guided by the first guide groove of the corresponding set and each guide pin is guided by the second guide groove of the corresponding set, the plurality of louver boards in which each turning shaft pin is formed so as to have a length which allows the turning shaft pin to pass through the first guide groove and project to the outside of the guide section;
    a cam roller that is placed so as to be rotatable about an axis line and has a plurality of cam grooves on a peripheral surface thereof, the cam roller that can reciprocate, by rotation thereof, each turning shaft pin by the plurality of cam grooves along the first guide groove in the first direction;
    a drive section that drives and rotates the cam roller,
    a photosensor that is provided on the guide section and detects whether the louver boards are in a closed state or an open state; and
    a shielding plate that is provided at the end of the cam roller that turns the photosensor on and off,
    wherein
        each cam groove of the plurality of cam grooves does not intersect with any other cam groove of the plurality of the cam grooves,
        each cam groove of the plurality of cam grooves receives at least one of the turning shaft pins,
        when the louver boards are brought into a state in which all the louver boards are opened from a state in which all the louver boards are closed, the cam roller is rotated 180 degrees, and when the louver boards are brought into a state in which all the louver boards are closed from a state in which all the louver boards are opened, the cam roller is rotated another 180 degrees in a same direction as the direction in which the cam roller is rotated to open all the louver boards.

2. The exhaust port shutter apparatus according to claim 1, wherein
the cam groove is formed so as to form a closed loop on the peripheral surface.

3. The exhaust port shutter apparatus according to claim 1, wherein
the cam groove is formed so as to have the shape of continuous wave in a circumferential direction on the peripheral surface of the cam roller.

4. The exhaust port shutter apparatus according to claim 1, wherein
the width of the louver board is set such that, when the louver boards are closed, an edge of one of the adjacent louver boards is placed to overlap with an edge of the other of the adjacent louver boards.

5. The exhaust port shutter apparatus according to claim 1, comprising:
a control section controlling the driving of the drive section based on a signal from the photosensor.

6. A projector comprising:
a casing that an image generating unit is placed inside;
an exhaust port formed in the casing; and
a shutter apparatus provided in the exhaust port,
wherein the shutter apparatus includes
a guide section in which a plurality of sets of guide grooves, each being formed of a first guide groove extending in a first direction and a second guide groove extending in a direction intersecting the first direction, are provided,
a plurality of louver boards each having a turning shaft pin and a guide pin provided with a predetermined space left between the turning shaft pin and the guide pin, the plurality of louver boards being provided in such a way that each turning shaft pin is guided by the first guide groove of the corresponding set and each guide pin is guided by the second guide groove of the corresponding set, the plurality of louver boards in which each turning shaft pin is formed so as to have a length which allows the turning shaft pin to pass through the first guide groove and project to the outside of the guide section,
a cam roller that is placed so as to be rotatable about an axis line and has a plurality of cam grooves on a peripheral surface thereof, the cam roller that can reciprocate, by rotation thereof, each turning shaft pin by the plurality of cam grooves along the first guide groove in the first direction, and
a drive section that drives and rotates the cam roller,
a photosensor that is provided on the guide section and detects whether the louver boards are in a closed state or an open state; and
a shielding plate that is provided at the end of the cam roller that turns the photosensor on and off,
wherein
each cam groove of the plurality of cam grooves does not intersect with any other cam groove of the plurality of cam grooves,
each cam groove of the plurality of cam grooves receives at least one of the turning shaft pins,
when the louver boards are brought into a state in which all the louver boards are opened from a state in which all the louver boards are closed, the cam roller is rotated 180 degrees, and
when the louver boards are brought into a state in which all the louver boards are closed from a state in which all the louver boards are opened, the cam roller is rotated another 180 degrees in a same direction as the direction in which the cam roller is rotated to open all the louver boards.

7. The projector according to claim 6, wherein
the cam groove is formed so as to form a closed loop on the peripheral surface of the cam roller.

8. The projector according to claim 6, wherein
the cam groove is formed so as to have the shape of continuous wave in a circumferential direction on the peripheral surface of the cam roller.

9. The projector according to claim 6, wherein
the width of the louver board is set such that, when the louver boards are closed, an edge of one of the adjacent louver boards is placed to overlap with an edge of the other of the adjacent louver boards.

10. The projector according to claim 6, comprising:
a control section controlling the driving of the drive section based on a signal from the photosensor.

* * * * *